United States Patent
Berky

(10) Patent No.: US 6,301,986 B1
(45) Date of Patent: Oct. 16, 2001

(54) GEAR ARRANGEMENT, ESPECIALLY FOR A DOUBLE SCREW EXTRUDER

(75) Inventor: Alfred Berky, Oberursel (DE)

(73) Assignee: P.I.V. Antrieb Werner Reimers GmbH & Co. KG, Bad Homburg (DE)

( * ) Notice: Subject to any disclaimer, the term of this patent is extended or adjusted under 35 U.S.C. 154(b) by 0 days.

(21) Appl. No.: 09/434,903

(22) Filed: Nov. 5, 1999

(30) Foreign Application Priority Data

Nov. 6, 1998 (DE) .............................................. 298 19 820

(51) Int. Cl.$^7$ ............................... F16H 57/00; F16H 1/22
(52) U.S. Cl. ............................................ 74/410; 74/424.7
(58) Field of Search ........................ 74/384, 410, 424.7, 74/665 GA, 665 GD

(56) References Cited

U.S. PATENT DOCUMENTS

| | | | |
|---|---|---|---|
| 3,064,490 | * 11/1962 | Sigg | 74/410 |
| 3,610,065 | * 10/1971 | Hayashi et al. | 74/410 |
| 4,261,225 | * 4/1981 | Zahradnik | 74/665 GA |
| 4,312,244 | * 1/1982 | Barnes et al. | 74/410 |
| 5,542,311 | * 8/1996 | Deeg | 74/410 |
| 5,907,982 | * 6/1999 | Urban | 74/606 R |

FOREIGN PATENT DOCUMENTS

| | | |
|---|---|---|
| 363 670 | 8/1981 | (AT) . |
| 846 856 | 8/1952 | (DE) . |
| 2 130 599 | 2/1972 | (DE) . |
| 2 212 757 | 4/1974 | (DE) . |
| 44 14 098 A1 | 10/1995 | (DE) . |
| 0 679 495 A1 | 11/1995 | (EP) . |
| 629331 | 11/1927 | (FR) . |
| WO 97/10939 | 3/1997 | (WO) . |

* cited by examiner

*Primary Examiner*—Allan D. Herrmann
(74) *Attorney, Agent, or Firm*—Akin, Gump, Strauss, Hauer & Feld L.L.P.

(57) ABSTRACT

A gear arrangement, especially for a double screw extruder, has a drive shaft and at least one driven element, wherein the driven element is in active connection, at least indirectly, with two intermediate gears driven by the drive shaft and can be driven by them. The intermediate gears (6, 7) are arranged on axles parallel to each other and act on the same driven element (8), wherein the intermediate gears are in mesh with a common distributor gear (5) coupled at least indirectly to the drive shaft (9) and can be driven by this distributor gear. The distributor gear is mounted in bearings so that it can move at least indirectly in the radial direction.

7 Claims, 4 Drawing Sheets

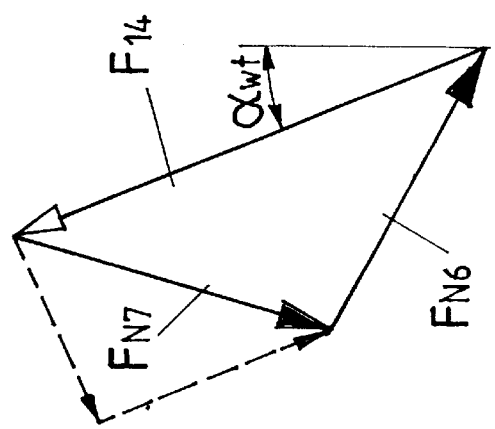
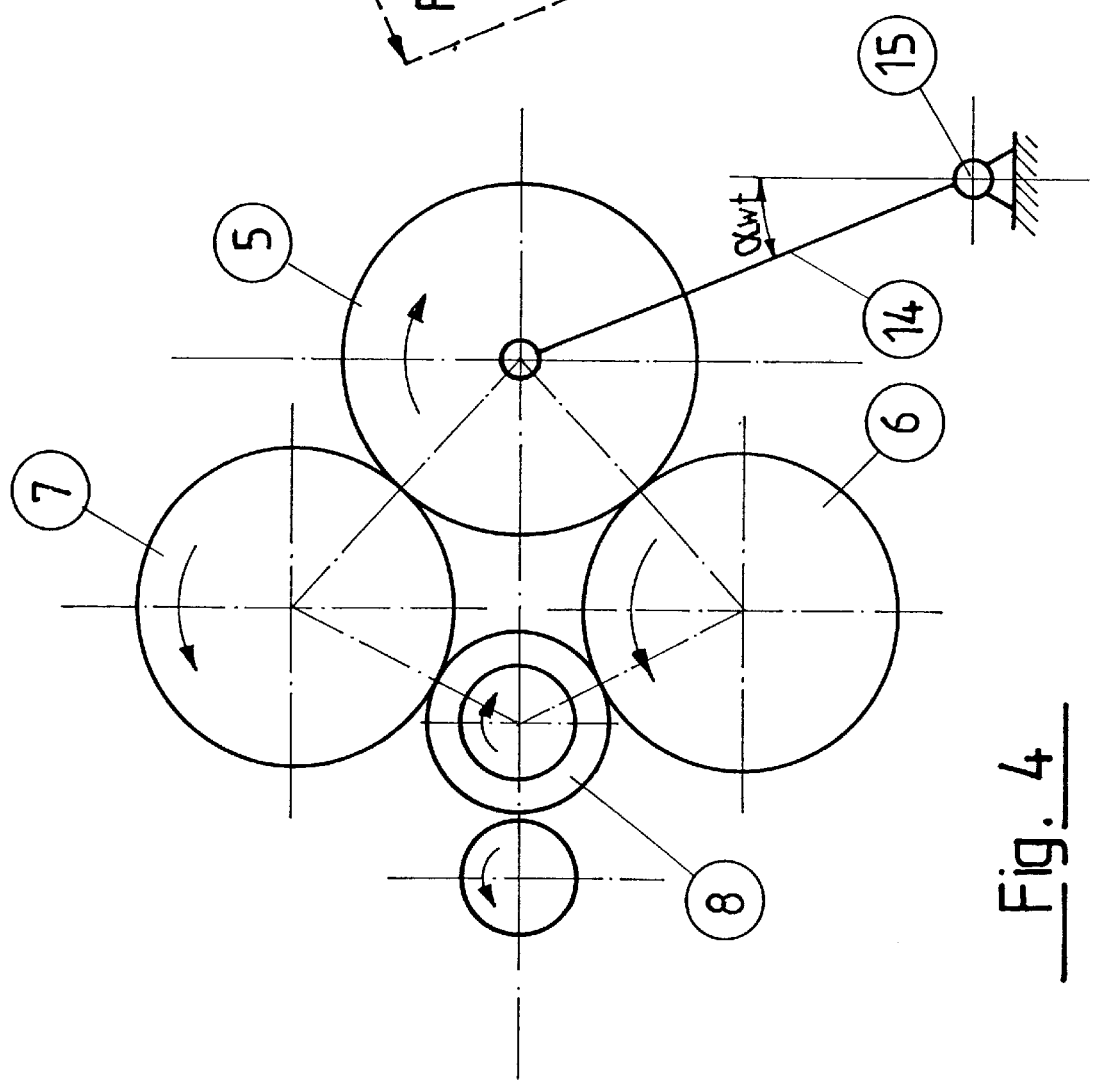
Fig. 5
Fig. 4

GEAR ARRANGEMENT, ESPECIALLY FOR A DOUBLE SCREW EXTRUDER

BACKGROUND OF THE INVENTION

The invention relates to a gear arrangement, particularly for a double screw extruder, having a drive shaft and at least one driven element.

Gear arrangements of this type are used in the most diverse areas of application, for which reason the following discussion of double screw extruder gears is only exemplary, but should not be taken as limiting in terms of the protection. The optimization problem is more or less common for all gear arrangements, that on the one hand, it should certainly be high-performance and thus, for example, be usable to transfer a large torque, but on the other hand, it should allow for as small an expense as possible.

Thus, expensively designed gear arrangements are already known whose driven shafts are driven via two side shafts, wherein both side shafts are constructed as torsion shafts and are accordingly expensively designed. The two side shafts are driven by the common drive shaft, optionally by the intermediate connection of a reduction gear. A simpler embodiment now consists, for example, in taking away one side shaft and transmitting the driving power only via one side shaft. As is not difficult to recognize, however, only a reduced torque can be transmitted in this case as compared with the embodiment having two side shafts. Finally, an alternative constructive form of a gear arrangement of the type mentioned at the beginning likewise has only one side shaft which, however, for improvement of the torque or driving power transmission, is provided with two teeth meshing areas in alignment with each other, which—relative to the drive direction—are arranged next to each other on the same side shaft or driven shaft and perform a simultaneous power transmission. However, the large spatial requirement necessary here in the axial direction is disadvantageous in this gear variation.

SUMMARY OF THE INVENTION

Taking this as a starting point, an object of the present invention is to further improve gear arrangements of the type mentioned at the beginning, especially in regard to their function and/or their operating behavior.

This object is achieved by the invention in that the driven element is in active connection, at least indirectly, with two intermediate gears driven by the drive shaft and can be driven by them, that the intermediate gears are arranged on axles parallel to each other and act on the same driven element, that the intermediate gears are in engagement with a common distributor gear coupled at least indirectly to the drive shaft and drivable by this distributor gear, and that the distributor gear is mounted in bearings so that it is movable at least indirectly in the radial direction.

The advantage results herein that, by the use of two intermediate gears, two meshing or engagement areas can be made available, and thus despite only one side shaft or torsion shaft driven by the distributor gear, a torque twice as large can be transmitted, compared with the constructive form having only one direct side shaft acting on the driven element and only over one meshing area, and this is done, in addition, at only a slight additional expense. Also, the gear arrangement can operate with a clearly reduced axial construction space compared to the described double meshing of two meshing areas that align with each other.

The special advantage of the gear arrangement presented here, however, lies above all in the fact that the pivotably mounted distributor gear provides that the torque transmission is not disturbed at either of the two intermediate gears, since the distributor gear can be brought into constant contact with the teeth of the intermediate gears by the radially movable, i.e. flexible bearing.

In addition, it is especially advantageous and simple if the radially movable bearing of the distributor gear is made in a pivotable manner and, in particular, via a pivoting element that picks up the distributor gear, and if the pivoting element is itself mounted via a pivoting bearing offset from the distributor gear axle and arranged fixed in the housing. While the distributor gear, which should thus be able to move relative to the two intermediate gears in the radial direction, is arranged to be freely rotatable in the rotational direction, but radially inflexible in the pivoting element, the pivoting element provides for the desired free mobility.

As far as the position of the pivoting bearing is concerned, the axle of the pivot bearing should be positioned relative to the distributor gear such that the plane formed through the axle of the pivot bearing and the axle of the distributor gear runs parallel to the resultant forces of the two tooth meshing normal force planes, so that this plane has a slope toward the plane formed by the axles of the intermediate gears, which corresponds to the drive meshing angle $\alpha_{wt}$ of the resultant forces of the two tooth meshings. This leads, in an especially advantageous way, to a force component acting perpendicularly to the cited resultant forces to press the distributor gear constantly against the load edges of the intermediate gears, such that for small pitch errors or tooth forming errors an active connection interrupted by the errors is immediately restored by the distributor gear being moved a distance away from the contactless meshing by the mentioned force component, until the active connection and thus also the equilibrium of the torque transfer on both intermediate gears is restored.

This automatic adjustment movement for the compensation of any pitch errors occurs of course in the same way for both meshing areas, i.e., relative to both intermediate gears and thus also provides for an equal distribution of the transmitted drive forces independently of which contact is impaired or disturbed by which intermediate gear.

As already mentioned at the beginning, the gear arrangement can be used in the most diverse of application cases. Thus, the driven element can be a pinion that acts together with a driven shaft, i.e., the gear arrangement can be used for a rotating driven movement—at best, without a reversal of the direction of rotation. In the same manner, however, it is also possible to use the invention for linear drives. As far as linear drives are concerned, the uniform distribution of the drive forces and/or the drive torque on both intermediate gears results especially when the drive is used for lifting or lowering, i.e., when the vertically acting weight force on the gear acts independently of the drive direction, such that the force components keep the same direction in the mesh areas independently of the conveying direction. In contrast, in the case of horizontal driving, a change of the drive direction also leads to a reversal of the drive forces, so that the equilibrium ratios can be modified because of the mentioned force component perpendicular to the supporting force. In this case, restoring the optimal equilibrium distribution on both intermediate gears would result only if the position of the pivot bearing of the distributor gear were to be adapted to the new directions of force flow and thus to the new drive meshing angles.

Expediently, the gear arrangement according to the invention thus functions for such applications always with the same drive direction, as is the case, for example, with double screw extruders or with alternating drive directions, if—as for example in lift drives—the force ratios or force directions in the meshes do not change by the reversal of the direction of rotation.

For use in double screw extruders the gear arrangement has two driven shafts, wherein only the first driven shaft can be driven by the two intermediate gears and the distributor gear, but the second driven shaft can be driven directly by the drive shaft, optionally with the intermediate connection of a reduction gear. The gear arrangement can hereby also be used for counter—current extrusion as well as for parallel extrusion.

An advantage of the high-performance, but also very simply designed, gear arrangement consists furthermore in that the gear arrangement housing must have only a single parting line, which runs either horizontally or vertically, wherein, for example, because of the small number of gears and the radially movable meshes, a simple assembly and disassembly is nevertheless possible.

BRIEF DESCRIPTION OF THE SEVERAL VIEW OF THE DRAWINGS

The foregoing summary, as well as the following detailed description of the invention, will be better understood when read in conjunction with the appended drawings. For the purpose of illustrating the invention, there are shown in the drawings embodiment(s) which are presently preferred. It should be understood, however, that the invention is not limited to the precise arrangements and instrumentalities shown. In the drawings:

FIG. 4 is a schematic diagram of the gear train of the gear arrangement from FIG. 1 with the drive engagement angle $\alpha_{wt}$; and FIG. 5 is the triange of forces acting in the gear arrangement from FIG. 1.

DETAILED DESCRIPTION OF THE INVENTION

Figure 1:
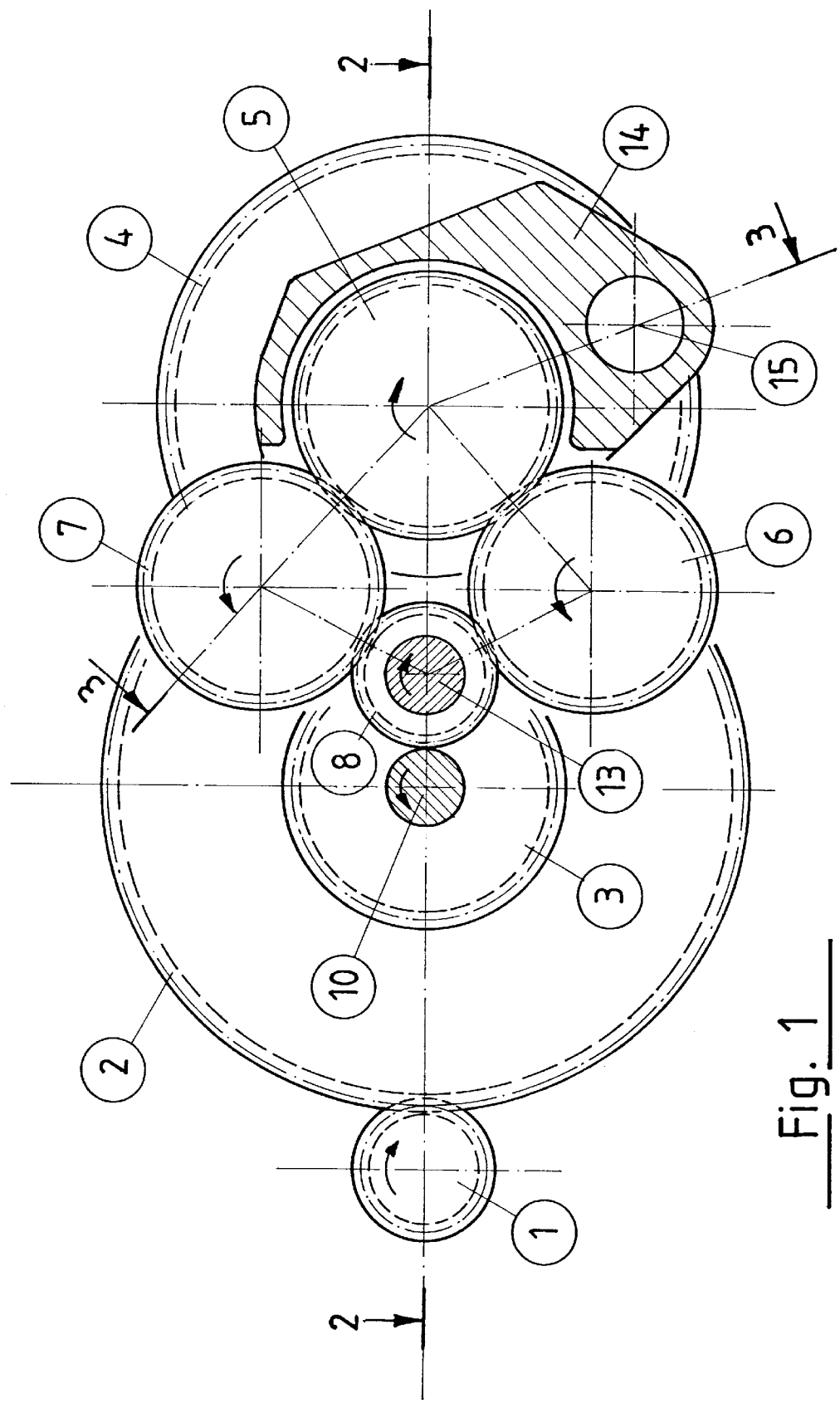
FIG. 1 is a front view of the gear arrangement according to the invention.
Figure 2:
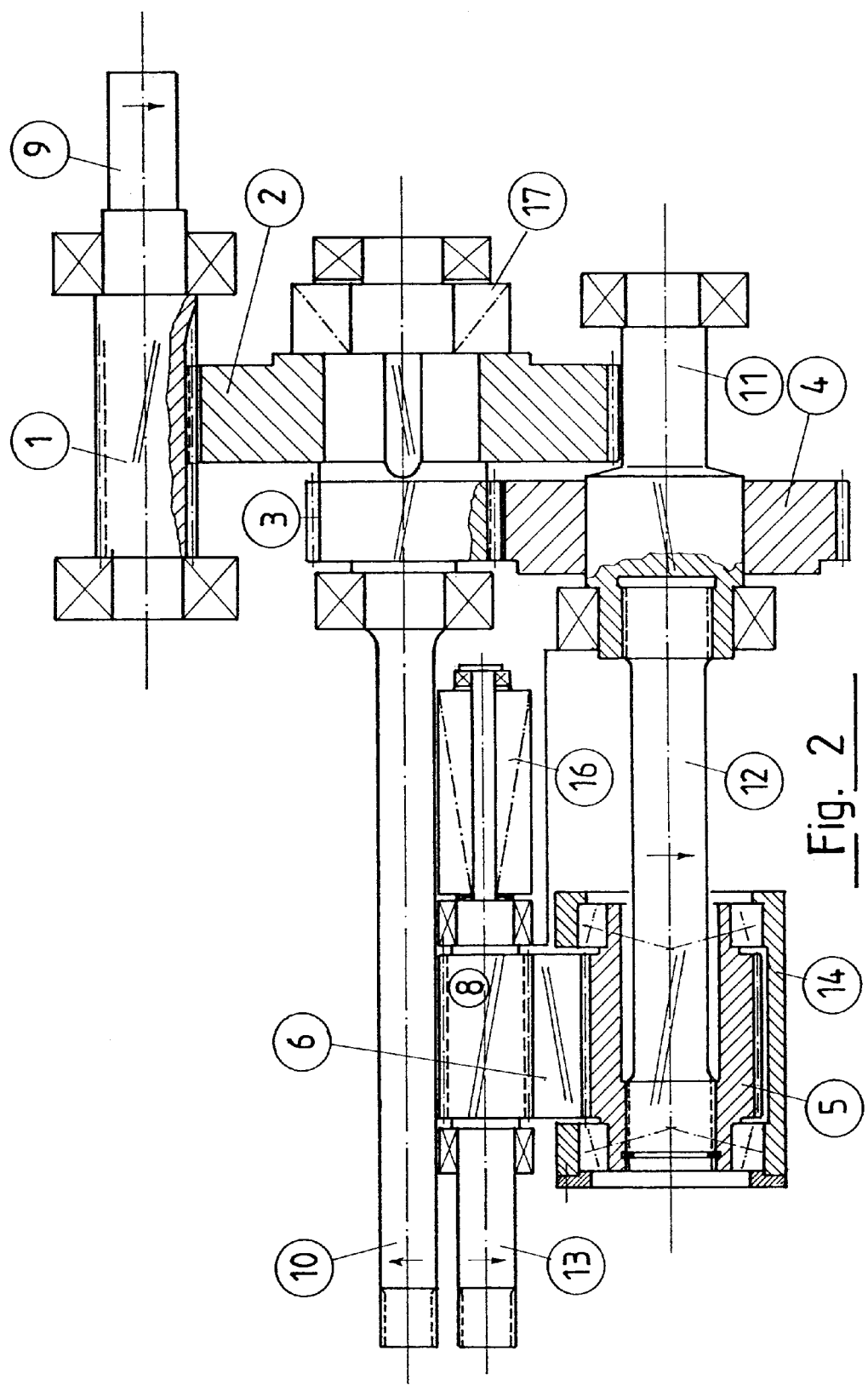
FIG. 2 is the gear arrangement from FIG. 1 along the sectional plane 2—2 from FIG. 1.
Figure 3:
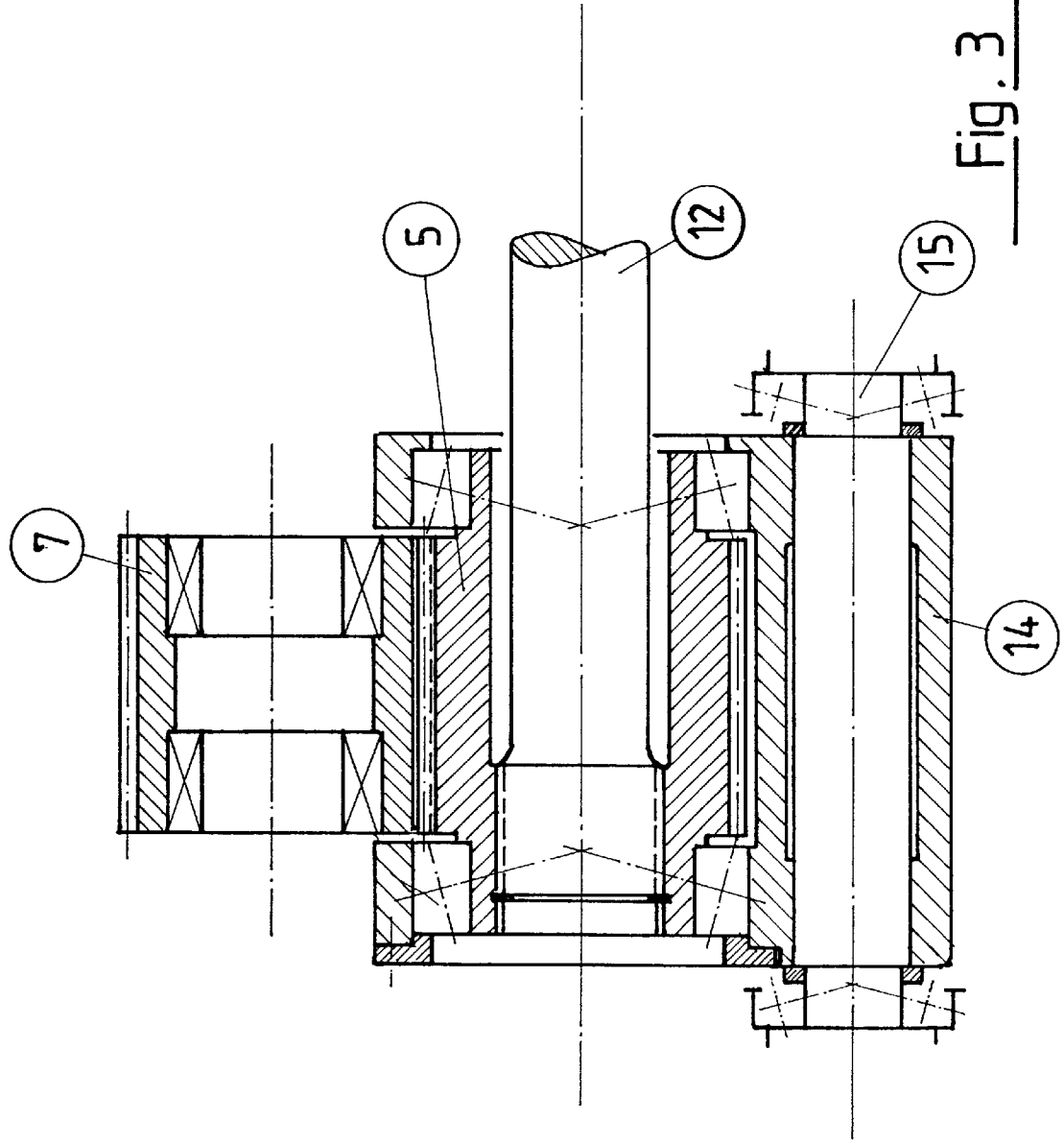
FIG. 3 is the gear arrangement from FIG. 1 along the sectional plane 3—3 from FIG. 1.

In FIGS. 1 to 3 a counter-current double screw extruder gear arrangement according to the invention is shown in various views, in which a rotating drive shaft 9 is provided for the purpose of driving two driven shafts 10, 13 in opposite rotational directions. For this purpose, the drive shaft 9 is connected, via a first gear 1 as well as a second gear 2, which reduce the drive rotational speed, to the driven shaft 10 onto which half of the driving power is transmitted. The other half is transmitted via a toothed gear 3 arranged in alignment with the second gear 2, as well as via a gear 4 meshing with it on a shaft 11, and transmitted via these to a torsion shaft 12, which is in alignment and active connection with the shaft 11, and which passes on this half driving power to a distributor gear 5. The distributor gear 5 divides—as can be seen best from FIG. 1—the driving power again into two intermediate gears 6 and 7, which are in active connection with the common pinion 8, which is arranged in alignment and in active connection with the second drive shaft 13.

The essential aspect of the present invention now lies in the fact that the distributor gear 5 is set in bearings in a pivot element 14 constructed as a rocker, which in turn has its pivot axis in a swivel pin 15, which is arranged offset from the axle of the distributor gear in the housing.

If the distributor gear having a spatially fixed axle were set in bearings, then a non-uniform distribution of the driving power on the two distributor gears 6 and 7 would result, because of the customary distance variations and tooth variations. With the invention presented here it is now achieved that in both tooth meshes, i.e. the meshing areas between the distributor gear 5 and the two intermediate gears 6 or 7, equal normal forces $F_{N6}$ and $F_{N7}$ are present, such that corresponding to the equilibrium conditions that can be recognized from FIGS. 4 and 5, a resultant supporting force $F_{14}$ acts at the drive meshing angle $\alpha_{wt}$ of both tooth meshes on the distributor gear. If now as a result of small tooth forming errors, the contact of the one tooth mesh is interrupted, a force component acting perpendicularly to the support force $F_{14}$ constantly provides for the rocker 14 to be moved far enough away from the contactless tooth mesh until the equilibrium is restored.

Since the—though only slight—excursion of the rocker 14 and thus the distributor gear 5 leads to an offset relative to the torsion shaft 12 as well as the shaft 11, the mentioned active connections between these components are constructed as catching teeth with slight crowning.

In regard to the mounting of the pin 15, it must be observed that this pin must be fixed so that it does not slide in either the axial or the radial direction, so that it can catch especially the axial forces caused by helical gearing of the gear elements.

In addition, it should also be mentioned that the diameter of the torsion shaft 12 is expediently dimensioned, so that on both driven shafts an equal torsion rigidity is achieved. The axial forces, which in the present case are transmitted by the worm screw pressure on the driven shafts 10 and 13, are absorbed by the bearings 16 or 17, wherein the helix direction on the gears 2, 3 and 8 is expediently selected so that the axial forces resulting from the teeth act to oppose the worm screw pressure force, and thus the axial bearings are unloaded. The radial bearings of the pinion 8 are partially unloaded by the intermediate gears 6 and 7, such that cost-effective commercially available roller bearings can be used.

In summary, with the present invention a short-constructed gear arrangement results having a very small gear number in the distributor gear and only one torsion shaft. Hereby, the advantage according to the invention of a clearly enlarged transfer of torque can be produced with a hardly increased construction expense, wherein the automatic uniform distribution of the driving power on the two intermediate gears provides that the intermediate gears—also not unintentionally—are not exposed to any increased stresses.

It will be appreciated by those skilled in the art that changes could be made to the embodiment(s) described above without departing from the broad inventive concept thereof. It is understood, therefore, that this invention is not limited to the particular embodiment(s) disclosed, but it is intended to cover modifications within the spirit and scope of the present invention as defined by the appended claims.

I claim:

1. A double screw gear arrangement for counter-current extrusion, comprising a drive shaft (9) and two counterrotational driven elements, wherein one of the two driven elements is in active connection, at least indirectly, with two intermediate gears (6, 7) driven by the drive shaft (9) and is driveable by them, the intermediate gears (6, 7) being arranged on axles parallel to each other and acting on the same driven element (8), the intermediate gears (6, 7) being in mesh with a common distributor gear (5) coupled at least indirectly to the drive shaft (9) and being driveable by this distributor gear (5), wherein the distributor gear (5) is mounted to be movable at least indirectly in a radial direction, and wherein a common torsion shaft (12) is arranged upstream of the distributor gear (5) and of the two intermediate gears (6, 7) so that a distribution of transmitted drive forces occurs at a downstream end of the gear arrangement.

2. The gear arrangement according to claim 1, wherein the distributor gear (5) is mounted to be at least indirectly pivotable.

3. The gear arrangement according to claim 2, wherein for the pivotable mounting of the distributor gear (5) it is arranged in a pivot element (14), and wherein the pivot element is pivotably mounted in a pivot bearing (15) arranged offset from an axle of the distributor gear.

4. The gear arrangement according to claim 3, wherein an axle of the pivot bearing (15) is positioned relative to the distributor gear (5) such that a plane formed by the axle of the pivot bearing (15) and the axle of the distributor gear (5) runs parallel to the resultant forces ($F_{14}$) of two tooth meshing normal force planes.

5. The gear arrangement according to claim 4, wherein the plane formed by the axle of the pivot bearing (15) and the axle of the distributor gear (5) has a slope towards a plane formed by axles of the intermediate gears (6, 7), which corresponds to the drive meshing angle $\alpha_{wt}$ of resultant forces of meshings of intermediate gears (6,7) with distributor gear (5).

6. The gear arrangement according to claim 1, wherein the driven element (8) is a pinion which acts together with a driven shaft (13).

7. The gear arrangement according to claim 1, comprising two driven shafts (10, 13), wherein only a first driven shaft (13) is driveable via the two intermediate gears (6, 7) and the distributor gear (5), but a second driven shaft (10) is driveable directly by the drive shaft (9), optionally with an intermediate connection of a reduction. gear (1, 2).

* * * * *